United States Patent [19]

Hunold et al.

[11] Patent Number: 4,495,123
[45] Date of Patent: Jan. 22, 1985

[54] DENSE SHAPED ARTICLES CONSISTING OF POLYCRYSTALLINE HEXAGONAL BORON NITRIDE AND PROCESS FOR THEIR MANUFACTURE BY ISOSTATIC HOT PRESSING

[75] Inventors: Klaus Hunold, Kempten; Alfred Lipp, Bad Worishofen; Klaus Reinmuth, Durach, all of Fed. Rep. of Germany

[73] Assignee: Elektroschmelzwerk Kempten GmbH, Munich, Fed. Rep. of Germany

[21] Appl. No.: 454,164

[22] Filed: Dec. 29, 1982

[30] Foreign Application Priority Data

Jan. 20, 1982 [DE] Fed. Rep. of Germany ....... 3201563

[51] Int. Cl.$^3$ .............................................. C01B 21/06
[52] U.S. Cl. .................................... 264/69; 264/325; 264/332; 501/96
[58] Field of Search .................. 264/332, 65, 325, 69; 423/290; 501/96

[56] References Cited

U.S. PATENT DOCUMENTS

| | | | |
|---|---|---|---|
| 3,455,682 | 7/1969 | Barbaras | 264/332 |
| 3,469,976 | 9/1969 | Iler | 264/332 |
| 3,513,229 | 5/1970 | Asbury | 264/28 |
| 3,562,371 | 2/1971 | Bush | 264/332 |
| 3,734,997 | 5/1973 | Mandorf | 423/290 |
| 4,007,251 | 2/1977 | Isaksson | 264/332 |
| 4,023,966 | 5/1977 | Loersch | 264/332 |

FOREIGN PATENT DOCUMENTS

| | | | |
|---|---|---|---|
| 2559228 | 5/1974 | Fed. Rep. of Germany . | |
| 1548603 | 12/1968 | France | 264/332 |
| 2200220 | 4/1974 | France . | |
| 1435810 | 5/1976 | United Kingdom | 264/332 |

OTHER PUBLICATIONS

Chemical Abstracts, vol. 97, 1982, p. 258, No. 43 096 f: Mattsson et al., (ASEA AB) Swed. SE 422, publ. Mar. 1, 1982.
Chemical Abstracts, vol. 74, 1971, p. 201, No. 56 893a: Brickway et al., AD 1970, No. 709 620 of Jul. 1970.

*Primary Examiner*—John A. Parrish
*Attorney, Agent, or Firm*—Burgess, Ryan & Wayne

[57] ABSTRACT

The invention is a shaped article of boron nitride having a density of at least 95% of the theoretical density which consists of polycrystalline hexagonal boron nitride in the form of a homogeneous isotropic microstructure and which has been manufactured from pure boron nitride powder without the concomitant use of sintering aids by isostatic hot-pressing in a vacuum-tight casing at temperatures of from about 1200° to 1500° C. under a pressure of from about 50 to 300 MPa. Boron nitride powders having a free boric oxide content of not more than 1.0% by weight and having a specific surface area of from 5 to 30 m$^2$/g are used as starting material. The powders either are filled into prefabricated casings consisting of steel or glass and densified by vibration or are preshaped to form green bodies having pores open to the surface and then placed in prefabricated casings or coated with a material which forms a vacuum-tight casing. The powders or the preshaped green bodies in the vacuum-tight casings are then subjected to an isostatic hot-pressing process in a high-pressure zone using an inert gas such as argon or nitrogen, as the pressure-transfer medium.

5 Claims, No Drawings

DENSE SHAPED ARTICLES CONSISTING OF POLYCRYSTALLINE HEXAGONAL BORON NITRIDE AND PROCESS FOR THEIR MANUFACTURE BY ISOSTATIC HOT PRESSING

Shaped articles consisting of polycrystalline hexagonal boron nitride are known. They are characterized by a combination of valuable properties such as high thermal conductivity, low electrical conductivity, good mechanical workability, high resistance to corrosion and to thermal shock. The articles show poor wettability by molten metals such as aluminium, copper and zinc; by non-metals such as silicon and boron and by non-metallic compounds such as glass and cryolite. Because of their properties, articles of polycrystalline hexagonal boron nitride are important, for example, as materials in the electronics industry and as crucible materials.

BACKGROUND OF THE INVENTION

The manufacture of shaped articles of this type is difficult and expensive. It is virtually impossible by prior art methods to densify pure boron nitride powder to a high degree without the concomitant use of sintering aids. The sintering aids make it impossible to provide shaped articles having a density approaching the density of pure boron nitride (2.27 g/cm$^3$).

The best results known hitherto with respect to the highest possible densification are achieved by hot die pressing at temperatures of from 1700° to 2200° C. at a die pressure of from approximately 10 to 30 MPa, boron nitride powder containing boric oxide having proved especially useful. Owing to the boric oxide content, the shaped articles thus obtained have poor high-temperature properties.

To improve the high temperature properties, the oxygen content of the boron nitride shaped articles manufactured by hot-die-pressing is reduced by washing out the boric oxide after sintering at from 1600° to 2100° C. (see U.S. Pat. No. 3,660,027 and U.S. Pat. No. 3,734,997, corresponding to DE-AS No. 20 21 952). The process, is unusually expensive and also is not useful for the treatment of relatively large shaped articles. Washing out the boric oxide to reduce the boric oxide content of relatively small shaped articles requires up to 44 days.

Regardless of the type of sintering aids used, shaped articles manufactured from hexagonal boron nitride powder by hot-die-pressing exhibit a directional grain growth and an anisotropic microstructure due to the biaxial application of pressure at a high temperature so that the properties of the articles are direction-dependent. The degree of anisotropy increases as higher degrees of densification are achieved.

Furthermore, it is generally known that, in addition to the customary hot-die-pressing using biaxial application of pressure, isostatic hot-pressing, with multidirectional application of pressure using an inert gas pressure-transfer medium can also be used. In isostatic hot-pressing, it is necessary to provide the powder to be densified or the article preshaped therefrom having open pores that is, having pores open to the surface, with a gas-tight casing to prevent the gas used as a pressure-transfer medium from penetrating into the article and interfering with densification.

Suitable casings for isostatic hot pressing of boron nitride powder having an excess of boron or nitrogen, are made of titanium or zirconium. The iron, chromium or nickel casings customarily used for isostatic hot-pressing form, with the excess boron or nitrogen, compositions which have melting points that are considerably lower than the melting points of the metal casing material. The casings become molten and no longer gas-tight and are penetrated by the pressure-transfer medium. It should therefore be possible to subject boron nitride powders of the type mentioned to the isostatic hot-pressing process at temperatures of from 1200° to 1600° C. under a pressure of from 20 to 300 MPa, but it must be pointed out expressly that under those conditions, boron nitride articles having high density have not been obtained (see U.S. Pat. No. 4,007,251).

Instead of the metal casings, preshaped articles may also be placed in prefabricated glass casings and the space between casing and article can be filled additionally with a glass powder that has a higher softening temperature than that of the casing itself (see Great Britain Patent Specification No. 1,529,966 corresponding to DE-PS No. 26 01 294).

Furthermore, some experimental work is known relating to the preparation of binder-free polygranular BN shapes from the technical report "Development and Evaluation of Hot Isostatically compacted Boron Nitride" of M. C. Brockway et al, AD 709 620 of July 1970, Battelle Memorial Institute, Columbus Laboratory, wherein commercial BN powders, purified by means of different purification techniques, were hydrostatically cold-pressed to form green bodies, which were then inserted into tantalum containers, sealed vacuum-tight by electron beam welding, and-hot isostatically compacted at temperatures of from 1650° C. to 2480° C. under pressures of 207 MPa (30,000 p.s.i.) resp. 103 MPa (15,000 p.s.i.) for 1 to 3 hours.

It can be seen from the discussion of the experimental results that the achieved densities were in the range of commercial hot-die-pressed BN bodies. The data did not show a general increase in density with temperature, presumably due to gross grain growth at high temperatures. It was also stated that improved purity of the starting powders did not improve the properties such as density and mechanical strength, although the oxygen contents were below the limit of the best commercial hot-die-pressed BN, which usually is about 1 percent. Furthermore, it was stated that the samples were not completely isotropic, i.e., that obviously a directional grain growth could not be suppressed despite the multidirectional application of pressure. X-ray diffraction data disclosed a substantial amount of anisotropy in the articles which appeared to decrease as the length to diameter ratio of the article increased.

The critical parameters, which are necessary for manufacturing shaped articles consisting of boron nitride by means of the isostatically hot pressing procedure to obtain improved properties namely, high density combined with a substantially isotropic microstructure, were not noted by the authors of this report.

The object of the invention is therefore to provide dense shaped articles consisting of boron nitride having improved properties, which are manufactured in a simple manner without expensive after-treatment, by densification of pure boron nitride powder without the concomitant use of sintering aids.

BRIEF SUMMARY OF THE INVENTION

The shaped articles accoring to the invention, have a density of at least 95% of the theoretical density (abbreviated hereinafter as % TD) of boron nitride (BN), and consist of polycrystalline hexagonal boron nitride having an isotropic microstructure. The articles are manufactured from pure boron nitride powder having a boric oxide content of not more than 1.0% by weight, by isostatic hot-pressing in a vacuum-tight casing at a temperature of from about 1200° to 1500° C. under a pressure of from about 50 to 300 MPa using an inert gas as the pressure-transfer medium.

DETAILED DESCRIPTION OF THE INVENTION

The shaped articles according to the invention are preferably manufactured from fine powders consisting of hexagonal boron nitride having a specific surface area within the range of from about 5 to 30 $m^2/g$ (measured according to the BET method which relates to the particle size), having a purity of at least 98.5% by weight which means that the sum of the analyses of boron and nitrogen is at least 98.5% by weight. The free boric oxide content of the powders is, according to the definition, not greater than about 1.0% by weight. Metallic impurities totalling up to about 0.2% by weight can be tolerated. The difference in composition up to 100% by weight is due for the most part, to oxygen in the form of adhering boron oxynitrides.

Commercial boron nitride powders from any desired source, that have been purified by customary methods such as heating to approximately 1800° C. and subsequently washing with methanol or water can be used in forming the articles of the present invention.

The shaped articles according to the invention can be manufactured by filling prefabricated casings of a desired shape with the pure boron nitride powder per se; the BN in the casings can then be compacted by vibration. Because of its low bulk density, the boron nitride powder can be advantageously granulated with small amounts of a temporary binder such as polyvinyl alcohol. The casing, together with its contents, are then evacuated and sealed gas-tight. If a temporary binder is utilized, it must be removed from the BN preferably by heat and vacuum before sealing the casing.

The boron nitride powder can, however, be preshaped into green bodies having an open pore structure that is, having pores open to the surface and can then be sealed under vacuum in a gas-tight casing. The shaping can be carried out by conventional methods as, for example, by die pressing or isostatic pressing. The concomitant use of a temporary binder is, in this case, generally not necessary. If desired, however, small amounts of a temporary binder can be used. Examples of temporary binders are polyvinyl alcohol and camphor which can be used in amounts of up to about 3% by weight, based on the weight of the boron nitride powder. It is critical that the binders decompose leaving virtually no residue at temperatures of less than about 1000° C. or are present in such low concentrations that the decomposition residue in the form of free carbon does not exceed about 0.1% by weight, based on the boron nitride. Although relatively large amounts of free carbon do not interfere with the densification process during the subsequent isostatic hot-pressing, they may cause a discoloration of the end product which is usually white, as follows from the known designation of boron nitride as "white graphite".

After being shaped, the green bodies preferably have a theoretical density of at least about 50% and most preferably about 60% TD and higher. Subsequently, the green bodies are preferably subjected to a thermal treatment by heating to from about 300° to about 1000° C., most preferably, from about 400° to about 700° C., before they are provided with a gas-tight casing, in order to ensure that during hot isostatic densification, neither gaseous decomposition products from the binders nor water vapor interferes with the densification process or damages the casing.

The material used for the casings must be able to be sealed gas-tight, and must be plastically deformable at the relatively low densification temperatures of from about 1200° to about 1500° C. required for boron nitride. Metals such as iron, chromium or nickel; metal alloys such as steel, and glasses or vitreous compositions which are plastically deformable within the densification temperature range can be used.

When using boron nitride powder per se, prefabricated casings or capsules are required. Steel casings which are easy to handle and are available at a favorable cost, have proved to be especially useful. Prefabricated casings can also be used with preshaped green bodies. In the case of preshaped green bodies, the gas-tight casing can, however, be produced by direct coating as, for example, by electroless wet deposition of a metal layer or by application of a vitreous composition which can subsequently be fused or sintered to form the gas-tight casing.

The encased samples are placed in a high-pressure autoclave and heated to the required densification temperature of at least about 1200° C. In the process, it is advantageous to control pressure and temperature separately that is, to increase the gas pressure when the casing material begins to plastically deform under the pressure and temperature conditions. Preferably, argon or nitrogen are used as inert gases for the transfer of pressure. The pressure applied lies preferably within the range of from about 100 to about 200 MPa and is reached by gradual increase in pressure when the final temperature used in each case, which is preferably at least about 1250° C., has been reached. The optimum temperature in each case is dependent on the fineness and purity of the boron nitride powder used. The optimum temperature, and in any case a temperature of about 1500° C., should not be exceeded in order to ensure that boron oxynitrides optionally present are not decomposed to form boric oxide.

After the pressure and temperature have been reduced, the cooled articles are removed from the high-pressure autoclave and freed from the casings as, for example, by twisting off metal casings or by sand-blasting glass casings.

Depending on the pressure applied, and the temperature and the dwell time under these conditions, the shaped articles manufactured by the present process have a density of at least 95% TD, preferably at least 99% TD. Owing to the multidirectional application of pressure and the relatively low pressing temperature, the articles produced by the present process, even at high degrees of densification, have a homogeneous, isotropic microstructure and their properties are no longer direction-dependent but are substantially equal in all directions.

The independence of the physical properties on direction is confirmed by the substantially identical values measured on specimens which were machined from the hot isostatic pressed boron nitride articles of the present invention. No grain growth was observed under the conditions of the process of the present invention that is, the grain sizes in the microstructure of the finished shaped article correspond virtually to the particle sizes of the boron nitride powder used. Articles with a flexural strength (mechanical strength) greater than 50 N/mm² are obtained by the present process. The articles of the present invention maintain their isotropic microstructure and mechanical strength at relatively high temperatures. The shaped articles have high thermal conductivity and a low E-modulus and are therefore highly resistant to thermal shock.

The shaped articles according to the invention consisting of polycrystalline hexagonal boron nitride are characterized by superior physical properties as compared with articles manufactured with the concomitant use of sintering aids, according to the conventional hot-pressing process and/or expensive after-treatment, and also better physical properties than articles prepared without sintering aids by isostatic hot pressing at relatively high pressing temperatures.

The articles of the present invention can be manufactured in a relatively simple manner, since the shape and the size of the article are neither limited by the adequately known limited shaping possibilities in a customary hot-die-press using die pressure, nor by the expensive and time-consuming encapsulating technique according to isostatic hot pressing at relatively high pressing temperatures which requires the use of tantalum containers. The tantalum containers must generally be sealed gas-tight by techniques such as electron-beam welding. The shaped articles according to the invention can be manufactured for example in a high-pressure autoclave, having a useful volume of greater than 1 m³, as relatively large articles in block form using simple steel casings which can be sealed gas tight in a simple manner without the need for complex sealing techniques.

The large articles can then be machined independently of direction to form relatively small articles of a desired shape.

Although it is known that by the isostatic hot-pressing process, articles consisting of pulverulent materials provided with a gas-tight casing can be densified, it is unexpected that, in the case of boron nitride, this can be achieved without the concomitant use of sintering aids at temperatures of less than about 1500° C. using simple steel casings which hitherto had not been considered possible.

The invention is explained in detail with reference to the following examples.

EXAMPLE 1

A boron nitride powder having the following analysis

| | % by weight |
|---|---|
| B | 43.3 |
| N₂ | 55.7 |
| Total O₂ | 0.8 |
| B₂O₃ | 0.07 |
| Ca | 0.05 | and a specific surface area of 14 m²/g was granulated using 0.3% by weight of polyvinyl alcohol and shaken on a vibrating table into a steel capsule (St 37) having a diameter of 120 mm and a height of 150 mm. The compacted apparent density of the granulate was approximately 0.8 g/cm³. A lid provided with an extraction connection piece was then welded onto the capsule, which was then heated in a furnace to 550° C. At the same time, the capsule was evacuated, through the extraction connection piece, using a vacuum pump. The end of the degassing operation was determined by a vacuum indicator. The extraction connection piece was squeezed together vacuum-tight with hydraulic nippers, cut off above the squeezed point and secured with a weld seam. The evacuated capsule filled with boron nitride was placed in an isostatic hot press and densified at 1450° C. under an argon gas pressure of 200 MPa and a dwell time of 180 min.

After cooling, the steel capsule was removed by cutting it open and uncoiling it from the boron nitride cylinder. The density of the shaped article was 2.24 g/cm³ (corresponding to 99.1% TD, based on the theoretical density of the powder of 2.26 g/cm³). The structure was finely crystalline. No grain growth with respect to the starting powder was observed.

The following properties were determined by testing specimens which were cut in the axial or in the radial direction, respectively, from the hot isostatic pressed boron nitride cylinder. The results are set forth in the following Table 1:

TABLE 1

| properties | axial | radial | factor axial/radial |
|---|---|---|---|
| flexural strength in N/mm² | 74.5 | 73.3 | 1.016 |
| E-modulus in N/mm² | 62 400 | 64 700 | 0.964 |
| coefficient of thermal expansion in K⁻¹ (25–1000° C.) | 2.92 10⁻⁶ | 2.78 10⁻⁶ | 1.050 |
| Knoop-hardness | | | |
| HK 100 | 54 | 52 | 1.038 |
| HK 25 | 62 | 61 | 1.016 |
| thermal conductivity in W/mk | | | |
| 300 K | 74 | 72 | 1.027 |
| 600 K | 52 | 51 | 1.019 |
| 1000 K | 39 | 39 | 1.000 |

The flexural strength was measured according to the 4-point loading (outer span 30 mm, inner span 15 mm) using rectangular test bars of the size 2×4×34 mm. The Knoop-hardness was determined by using a load of 0.98N (HK 100) and 0.245N (HK 25). The values are related to daN/mm².

As can be seen from the substantially identical values measured on specimens which were cut in the axial or in the radial direction, respectively, the properties were independent of the direction.

The results shown in Table 2 were determined to be independent of the direction in the article.

TABLE 2

| | |
|---|---|
| compression strength in N/mm² | 297.5 |
| loss tangent tan α (average value of 20 measurements at 100 kHz) | 3 × 10⁻⁴ |
| dielectric constant ε | 4.90 |
| electrical resisting in ohm × cm | 2.20 × 10¹² |

The loss tangent tan δ was measured at a frequency of 100 kHz; comparative measurements in the range of 10 kHz to 10 MHz did not show significant differences.

The dielectric constant ε was calculated from the capacity, which was also measured at a frequency of 100 kHz.

EXAMPLE 2

A boron nitride powder having the following analysis

|  | % by weight |
|---|---|
| B | 43.2 |
| $N_2$ | 55.4 |
| total $O_2$ | 1.3 |
| $B_2O_3$ | 0.9 |
| Ca | 0.05 | and having a specific surface area of 25 m²/g was isostatically pressed in a polyvinyl chloride casing at 400 MPa liquid pressure without pressing additives to form a green body having a diameter of 230 mm and a height of 300 mm. The density of the green body was 1.76 g/cm³ (corresponding to 79% TD). The polyvinyl chloride casing was removed. The green body was placed in a suitable steel capsule (St 37) and a lid provided with an extraction connection piece was welded on. The heating and sealing of the capsule was carried out as described in Example 1. The encased sample was hot isostatically pressed at 1400° C. under an argon pressure of 150 MPa and a dwell time of 120 min. After densification, the casing was removed by cutting it open and uncoiling it. The density of the shaped article obtained was 2.21 g/cm³ (corresponding to 99.1% TD, based on the theoretical density of the powder used of 2.23 g/cm³). The microstructure was finely crystalline.

EXAMPLE 3

The boron nitride powder of Example 2 was isostatically cold-pressed to form a cylinder having a diameter of 60 mm and a height of 120 mm and was placed in a silica-glass capsule. The cold-pressing pressure, the density of the pressed article and the heating conditions corresponded to the conditions used in Example 2. After degassing, the extraction connection piece was sealed vacuum-tight. The glass-encased sample was hot isostatically pressed at 1500° C., 200 MPa argon pressure for 180 minutes dwell time. After densification, the glass casing was removed. The density of the shaped article obtained was 2.23 g/cm³ (corresponding to 100% TD). The microstructure was finely crystalline.

We claim:

1. A process for the manufacture of a shaped, isotropic article of boron nitride article by isostatic hot-pressing using an inert gas as a pressure-transfer medium, which comprises: introducing boron nitride powder having a boric oxide content of not more than 1% into a prefabricated casing, compacting the boron nitride by vibrating the casing; sealing the casing containing the compacted boron nitride vacuum tight under a vacuum; heating the encased compacted boron nitride in a high-pressure zone to from about 1200° to 1500° C. while gradually increasing the gas pressure to about 50 to 300 MPa until dense shaped articles are formed; and cooling and recovering the shaped articles wherein the boron nitride powder employed is devoid of sintering aids.

2. A process for the manufacture of a shaped, isotropic article of boron nitride by isostatic hot-pressing using an inert gas as a pressure-transfer medium, which comprises: introducing boron nitride powder having a boric oxide content of not more than 1% into a prefabricated casing, compacting the boron nitride by vibrating the casing; sealing the casing containing the compacted boron nitride vacuum tight under a vacuum; heating the encased compacted boron nitride in a high-pressure zone to from about 1200° to 1500° C. while gradually increasing the gas pressure to about 50 to 300 MPa until dense shaped articles are formed; and cooling and recovering the shaped articles wherein the boron nitride powder employed is deboid of sintering aids.

3. A process for the manufacture of a shaped isotropic article boron nitride by isostatic hot-pressing in a high-pressure zone using an inert gas as a pressure-transfer medium which comprises: shaping boron nitride powder having a boric oxide content of not more than 1% to form a green body having pores open to the surface, the resulting preshaped green body having a density of at least 50% of the theoretical density of the boron nitride; placing the green body in a prefabricated casing or coating the green body with a material which forms a vacuum-tight casing; sealing the casing vacuum-tight under a vacuum; heating the encased green body in a high-pressure zone to from about 1200° to 1500° C. while gradually increasing the gas pressure to from about 50 to 300 MPa until a dense shaped article is formed; and cooling and recovering the shaped article wherein the boron nitride powder employed is devoid of sintering aids.

4. A process for the manufacture of a shaped isotropic article of boron nitride by isostatic hot-pressing in a high-pressure zone using an inert gas as a pressure-transfer medium which comprises: shaping boron nitride powder having a boric oxide content of not more than 1% to form a green body having pores open to the surface the resulting preshaped green body having a density of at least 50% of the theoretical density of the boron nitride; placing the green body in a prefabricated casing or coating the green body with a material which forms a vacuum-tight casing; sealing the casing vacuum-tight under a vacuum; heating the encased green body in a high-pressure zone to from about 1200° to 1500° C. while gradually increasing the gas pressure to from about 50 to 300 MPa until a dense shaped article is formed; and cooling and recovering the shaped article wherein the boron nitride powder employed is devoid of sintering aids.

5. A process according to claim 1, 2, 3, or 4 wherein the prefabricated casing consists of steel.

* * * * *